United States Patent

Burack et al.

[11] Patent Number: 5,981,064
[45] Date of Patent: Nov. 9, 1999

[54] FLEXIBLE FILAMENT DEVICE WITH PRESSURE-SENSITIVE FLAME RETARDANT ADHESIVE

[75] Inventors: John Joseph Burack, Toms River; Hung Chi Ling, Princeton, both of N.J.

[73] Assignee: Lucent Technologies Inc., Murray Hill, N.J.

[21] Appl. No.: 08/974,913

[22] Filed: Nov. 20, 1997

[51] Int. Cl.⁶ ............................................. D02G 3/00
[52] U.S. Cl. ................................... 428/375; 428/378
[58] Field of Search .................... 428/355 AC, 920, 428/921, 375, 378, 385, 388; 526/278

[56] References Cited

U.S. PATENT DOCUMENTS 4,770,490  9/1988  Gruenewald et al. .............. 350/96.23
5,292,390  3/1994  Burack et al. ...................... 156/175

*Primary Examiner*—Bruce H. Hess
*Assistant Examiner*—Chris Cronin

[57] ABSTRACT

A flexible energy-carrying circuit device has reduced flame retardancy while maintaining desired levels of adhesion between the energy-carrying filaments and the substrate with use of a flame-retardant pressure-sensitive adhesive comprised of a polymer of one or more acrylic esters with bromine and phosphorous compounded into the polymer to provide an adhesive having inherent flame retardancy. Small quantities of antimony trioxide may be dispersed in the adhesive to enhance flame retardancy.

19 Claims, 3 Drawing Sheets

FLEXIBLE FILAMENT DEVICE WITH PRESSURE-SENSITIVE FLAME RETARDANT ADHESIVE

FIELD OF THE INVENTION

The present invention relates to a flexible energy-carrying circuit device having a pressure-sensitive, flame-retardant adhesive for bonding energy-carrying filaments to a substrate, and to an improved method of adhering filaments and particularly optical fibers to a substrate.

BACKGROUND OF THE INVENTION

A flexible energy-carrying circuit device may involve use of a pressure-sensitive adhesive to adhere energy-carrying filaments of the device to a substrate. For example, FIG. 1 shows a fragmented cross-sectional view of a typical flexible optical circuit apparatus in which an adhesive is used to secure the fibers to a substrate. The apparatus 10 comprises a plurality of optical fibers 12, encapsulated in an encapsulating sheet 14, such as polyurethane, nylon, polypropylene, KAPTON,™ doped MYLAR,™ or aluminum foil. The encapsulating sheet 14 protects the optical fibers, provides structural stability, and keeps the fibers in place during handling, yet it also should be flexible so that the apparatus may be mounted in an appropriate structure or connected to other systems or machines. A pressure-sensitive adhesive 16 is used to adhere the encapsulated fibers to a substrate 18. The substrate 18 is typically comprised of a flexible plastic and advantageously is fabricated with a polymer of the type commercially identified as KAPTON™, which is non-flammable and does not melt. A material that previously has been used for the pressure-sensitive adhesive 16 comprises number 711 adhesive, a resin available from Adchem Corporation of Westbury, N.Y. For further background regarding fiber optic structures, encapsulation techniques, and materials and methods used in these structures, see U.S. Pat. No. 5,582,673 to Burack and Ling et al (inventors herein), issued Dec. 10, 1996, entitled "Optical Fiber Encapsulation Techniques," and U.S. Pat. No. 5,259,051 to Burack et al. (an inventor herein), issued Nov. 2, 1993, entitled "Optical Fiber Interconnection Apparatus and Methods of Making Interconnections," both of which are hereby incorporated by reference.

A drawback with this structure, however, is that the encapsulating sheet 14 particularly when comprised of thermoplastic material may melt when heated, affecting the structural integrity of the apparatus. More importantly, when the thermoplastic melts, for example, in response to a flame, it may expose the adhesive 16 to the air, causing the adhesive when flammable to ignite. Also, the temperature of these devices as well as other electronic devices employing adhesives may increase during operation, leading to flammability concerns.

It is desirable that optical circuits and other energy-carrying devices meet certain levels of flame retardancy. Optical circuits and electronic devices are tested for flame retardancy pursuant to standards known in the industry for measuring the flammability of plastics used in electronic devices and appliances, namely, the Underwriters' Laboratory (UL) 94 standards. The UL standards are well known and are also described in M. Robert Christy, Standards, Bans, and Flame Retardants, PLASTICS COMPOUNDING (September/October 1993), at pp. 59–61. The UL 94 vertical (UL94V) standards have been applied to optical circuit devices, including the UL94V test and the 94VTM test, with the latter test (94VTM), applicable for thinner materials prone to distortion.

The flammability of optical circuits and energy-carrying devices has been addressed in many ways, including reconfiguring the devices and replacing the thermoplastic materials with materials having higher melting points. For example, one method has been to apply a second layer of KAPTON™ or other non-flammable coversheet 20 (FIG. 1A), over the thermoplastic encapsulant, which protects the thermoplastic and reduces the likelihood that it will melt. Another method involves rolling the system into a cylinder with the KAPTON™ substrate 18 facing out (FIG. 1B). U.S. Pat. No. 5,582,673, referenced above, describes encapsulation techniques involving materials other than thermoplastic in addressing flammability issues. While these methods are effective in reducing the flammability of the circuit overall, they limit the flexibility of the device and the configurations in which, and materials with which, the device can be fabricated. It would be beneficial to have a method of adhering the optical fibers to the substrate which avoids the use of flammable adhesives or involves adhesives having reduced flammability.

Developing pressure-sensitive adhesives that have good adhesive properties and yet are non-flammable and suitable for use in fiber optic and other energy-carrying devices has presented many challenges. A pressure-sensitive adhesive may be defined as a material that bonds surfaces at room temperature and with the application of some (and preferably a low) pressure. Typically, materials with good adhesive, cohesive, and tack qualities are also flammable. Pressure-sensitive materials based on acrylates or polyacrylates, for example, are tough, resilient, and flexible materials that have excellent pressure-sensitive adhesive properties, but they are also flammable.

Typically, to reduce the flammability of a pressure-sensitive adhesive, combustion-inhibiting compounds have been added to the adhesive. The most commonly-used additive is antimony trioxide which often is used in combination with halides, such as titanium tetrachloride. Making an adhesive flame retardant can be more complicated, however, than simply adding the combustion-inhibiting material, because the additive may disrupt the sensitive balance of properties of the material. For example, certain phosphates, while combustion-inhibiting, will greatly weaken the cohesive properties of the adhesives and cannot effectively be used.

The use of combustion-inhibiting additives has been found to be impractical for optical circuits. For the circuits to meet desired levels of flame retardancy as previously discussed, quantities of combustion-inhibiting additives at greater than twenty-five percent of the total solids would have to be added to the adhesive. However, typical flame retardant systems such as those based upon antimony oxide tend to settle out of acrylic coatings and adhesives, and they opacify the polymer and detract from its adhesive properties. Thus, the addition of sufficient quantities of combustion-inhibiting additives to meet flame-retardancy standards decreases the tack of the adhesives to the point that they can no longer meet desired fiber placement tolerances.

Thus, there is a need for a method of adhering energy-carrying filaments and particularly optical fibers to a substrate which avoids the use of flammable adhesives or which reduces the flammability of the adhesives while maintaining the adhesive qualities to a degree sufficient for such applications. This invention addresses this need. Further advantages may appear more fully upon consideration of the description below.

SUMMARY OF THE INVENTION

Applicants have discovered that a flame-retardant pressure-sensitive adhesive may be used in energy-carrying devices such as optical fiber devices in which flame-retardancy is incorporated into the polymer backbone of the adhesive. Summarily described, the invention embraces an energy-carrying circuit device involving a substrate and at least one energy-carrying filament attached to the substrate with a pressure-sensitive adhesive, wherein the adhesive comprises a polymer having bromine and phosphorous constituents compounded into the backbone of the compound, and small quantities of antimony trioxide may be blended in the adhesive polymer. The energy-carrying filament may comprise an optical fiber encapsulated in a sheet of thermoplastic material. Preferably, the adhesive involves a composition comprising a solution or emulsion polymerization of one or more acrylic esters, dibromostyrene, and vinyl phosphonic acid, with or without acrylic acid, compounded with antimony trioxide. The invention further embraces a method of applying the adhesive in fabricating an energy-carrying device comprising casting the adhesive onto an anti-stick liner, curing the adhesive, pressing the adhesive and liner onto a substrate, and peeling the liner.

BRIEF DESCRIPTION OF THE DRAWINGS

For a better understanding of the invention, an exemplary embodiment is described below, considered together with the accompanying drawings, in which.

Figure 1:
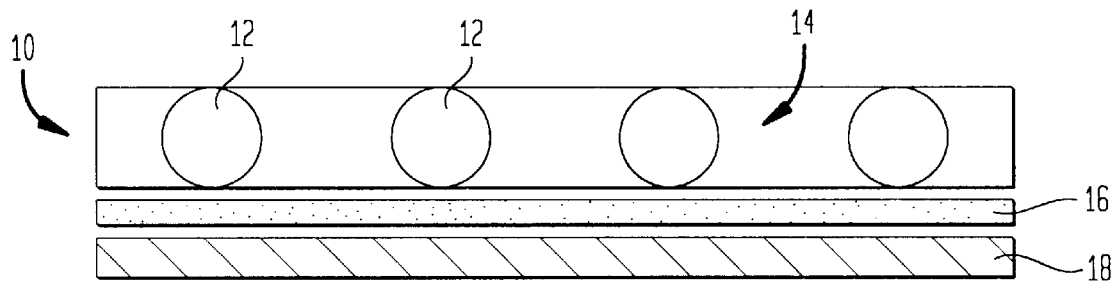
FIG. 1 is a cross-sectional fragmented view of an optical fiber circuit involving use of an adhesive.

It is to be understood that these drawings are for the purposes of illustrating the concepts of and/or applications for the invention and except for the graphs are not to scale.

DETAILED DESCRIPTION OF THE INVENTION

Applicants have found that an optical circuit device meeting desired levels of flame retardancy and adhesion can be obtained with use of a flame-retardant pressure-sensitive adhesive in which flame-retardancy is incorporated into the polymer backbone of the adhesive, thereby reducing the need to rely upon flame-retardant fillers or alternative configurations for the devices. A preferred adhesive for this application is described in co-pending U.S. patent application Ser. No. 08/974,914 (to be supplied), filed by John J. Burack (an inventor herein), and Peter A. Yurcick, entitled "Pressure-Sensitive Flame Retardant Adhesive," filed contemporaneously herewith, which is hereby incorporated by reference.

Preferably, the adhesive comprises a composition fabricated with a solution or emulsion polymerization of one or more acrylic esters, dibromostyrene, and vinyl phosphonic acid, with or without acrylic acid, compounded with antimony trioxide. The high bromine content of the dibromostyrene provides good flame retardant properties, while the aromaticity of the compound assures good thermal and hydrolytic stability. The phosphorus content of this adhesive increases the efficacy of the flame retardant to the point where only relatively small quantities of $Sb_2O_3$ are needed to obtain the desired levels of flame retardancy, such that the adhesive tack of the composition is maintained at a level suitable for use in optical circuits or other energy-carrying applications. Adhesives fabricated according to this preferred composition are described in the aforementioned Burack and Yurcick U.S. application Ser. No. 08/974,914.

An advantageous adhesive composition comprises a solution or emulsion polymerization of dibromostyrene, acrylic esters, and vinyl phosphonic acid. With solution polymerization, acrylic acid also is incorporated into the polymerization mixture. Preferred acrylic esters comprise butyl acrylate and 2-ethylhexyl acrylate. However, other acrylates and/or methacrylates may be used, including any one or more of methyl acrylate, methyl methacrylate, ethyl acrylate, n-butyl acrylate, n-butyl methacrylate, hexyl acrylate, isooctyl acrylate, and vinyl acetate. The resultant copolymer may be remixed with dispersions of antimony trioxide ($Sb_2O_3$) preferably in an approximate ratio of 100 parts co-polymer per about 8–10 parts $Sb_2O_3$.

The high bromine content of this adhesive provides good flame retardant properties, while the aromaticity of the compound assures good thermal and hydrolytic stability. The phosphorus content increases the efficacy of the flame retardant to the point where only relatively small quantities of $Sb_2O_3$ may be needed to obtain the desired levels of flame retardancy. The best combination of flame retardancy and adhesive qualities is obtained when emulsion polymerization is used. Emulsion polymers are preferred to solution polymers due to the reaction kinetics. Dibromostyrene tends to react more slowly with acrylic esters in solution than in emulsion and tends to form dibromostyrene homopolymers rather than desired copolymer compositions.

Preferably, with emulsion polymerization 2-ethylhexyl acrylate is the predominating acrylic ester, with the ratio of 2-ethylhexyl acrylate to butyl acrylate approximating 2:1. With solution polymerization, roughly equal parts of 2-ethylhexyl acrylate and butyl acrylate have proved advantageous. Small quantities of vinyl phosphonic acid are incorporated into the emulsion or solution polymerization mixture, with the percentage of vinyl phosphonic acid being about 1 to 5% of the total monomers charged. Preferred compositions for emulsion polymerization have approximate by weight percentages as follows: 1 percent vinyl phosphonic acid, 50 percent 2-ethylhexyl acrylate, 26 percent n-butyl acrylate, 23 percent dibromostyrene. For solution polymerization, preferred by weight percentages comprise 5 percent vinyl phosphonic acid, 35 percent 2-ethylhexyl acrylate, 35 percent n-butyl acrylate, 23 percent dibromostyrene, and 2 percent acrylic acid.

A composition obtained with the polymerization can be represented by the formula (I):

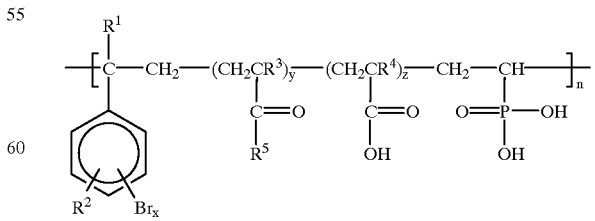

in which n is an integer having a value of about 1 to 200, x=1 to 4, y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. When latex (emulsion) polymerization techniques are employed, z=0.

The composition obtained with the polymerization involving a monomer of vinyl acetate can be represented by the formula (II):

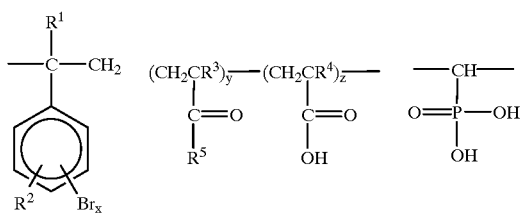

in which n is an integer having a value of about 1 to 200, x=1 to 4, w=1 to 4; y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. With latex (emulsion) polymerization techniques, z=0.

The specified monomers advantageously can be used in the ratios specifically stated herein or admixed with vinyl acetate and acrylic esters (such as acrylate and methacrylate esters) in such proportions as to provide copolymers having glass transition temperatures ($T_g$) of about –15° C. to –55° C. Preferably latex polymers are used with a weight average molecular weight of at least about 150,000, or solution polymers with a weight average molecular weight of approximately 76,000. The bromine content is preferably at least about 11.6 to 15.6 percent, and the phosphorus content is preferably about 0.25 to 2.5 percent.

Applicants have found that these adhesives as incorporated into energy-carrying devices meet desired levels of flame retardancy while maintaining needed adhesive, cohesive, and tack properties. For example, a latex adhesive composition was fabricated comprising about 1 percent vinyl phosphonic acid, 50 percent 2-ethylhexyl acrylate, 26 percent n-butyl acrylate, and 23 percent dibromostyrene, mixed with antimony trioxide at 10 parts $Sb_2O_3$ per 100 parts polymer. The wet adhesive was cast on a bleached kraft silicone release liner, air dried for 15 minutes, cured for 6 minutes at 200 degrees F., and transferred to a 2 mil KAPTON™ film. The adhesive-coated KAPTON™ films were tested for UV 94 ratings. In one set of tests, twenty samples were tested to produce six VO ratings and 13 VI ratings. Therefore, of these twenty samples only one failed to produce a VO or VI passing rating.

Similar tests were conducted with a solution polymer of the adhesive, comprising about 5 percent vinyl phosphonic acid, 35 percent 2-ethylhexyl acrylate, 35 percent n-butyl acrylate, 23 percent dibromostyrene, and 2 percent acrylic acid. This composition was mixed with 10 and 12 parts $Sb_2O_3$ per 100 parts polymer. The adhesives were cast on a release liner, transferred to a KAPTON™ film and tested for UV 94 ratings. In one set of tests, five samples using 0 parts $Sb_2O_3$, five samples using 10 parts $Sb_2O_3$, and five samples using 12 parts $Sb_2O_3$ were analyzed. The first set of samples (0 $Sb_2O_3$) produced four V1 ratings and one failure. The second set of samples (10 pts. $Sb_2O_3$) produced three V1 ratings, one V0 rating, and one failure. The last five samples (12 pts. $Sb_2O_3$) produced one V0 rating and four V1 ratings. Thus, of these fifteen samples comprising the solution polymer remixed with $Sb_2O_3$ only two failed to produce a V0 or V1 passing rating.

The UL 94V flammability tests were repeated and reconfirmed for both emulsion and solution polymers remixed with 10 parts $Sb_2O_3$ per 100 parts polymer. Notably, films comprising Adchem number 711 as the adhesive, as described in U.S. Pat. No. 5,259,051 to Burack et al., have an average burn time of about forty-seven seconds under UV-94 tests, whereas with the same parameters, the device of this invention exhibited far lower burn times, as reported in Table 1 below.

TABLE I

EXEMPLARY BURN-TIME RESULTS

| Sample # | Emulsion | | | Solution | | |
|---|---|---|---|---|---|---|
| | 1st Burn (Sec.) | 2nd Burn (Sec.) | Total (Sec.) | 1st Burn (Sec.) | 2nd Burn (Sec.) | Total (Sec.) |
| 1 | 25 | 0 | 25 | 22 | 3 | 25 |
| 2 | 45* | — | 45 | 13 | 7 | 20 |
| 3 | 25 | 3 | 28 | 25 | 8 | 33 |
| 4 | 20 | 5 | 25 | 40* | — | 40 |
| 5 | 0 | 20 | 20 | 18 | 8 | 26 |
| 6 | 1 | 15 | 16 | 17 | 0 | 17 |
| 7 | 19 | 13 | 32 | 18 | 4 | 22 |
| 8 | 23 | 45* | 68 | 25 | 3 | 28 |
| 9 | 18 | 13 | 31 | 11 | 8 | 19 |
| 10 | 0 | 8 | 8 | 40 | — | 40 |

*Indicates sample burned beyond the 5 inch mark.

Figure 1A:
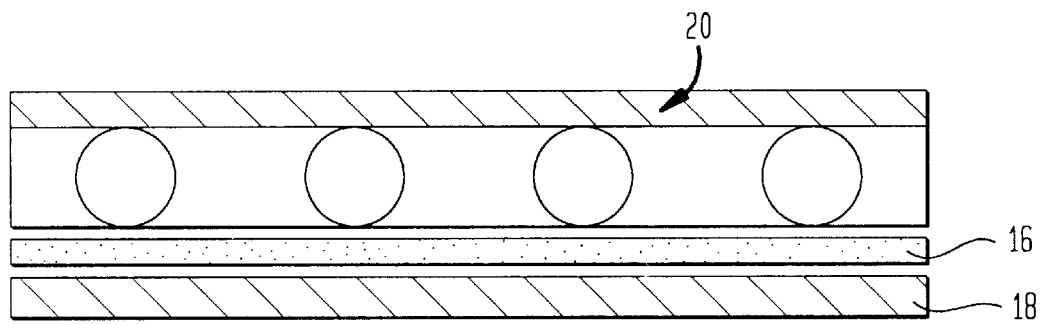
FIG. 1A is an alternative configuration for an optical fiber circuit.
Figure 1B:
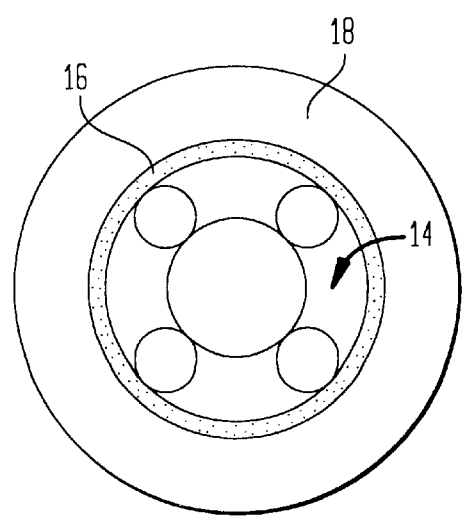
FIG. 1B is another alternative configuration for an optical fiber circuit.
Figure 2A:
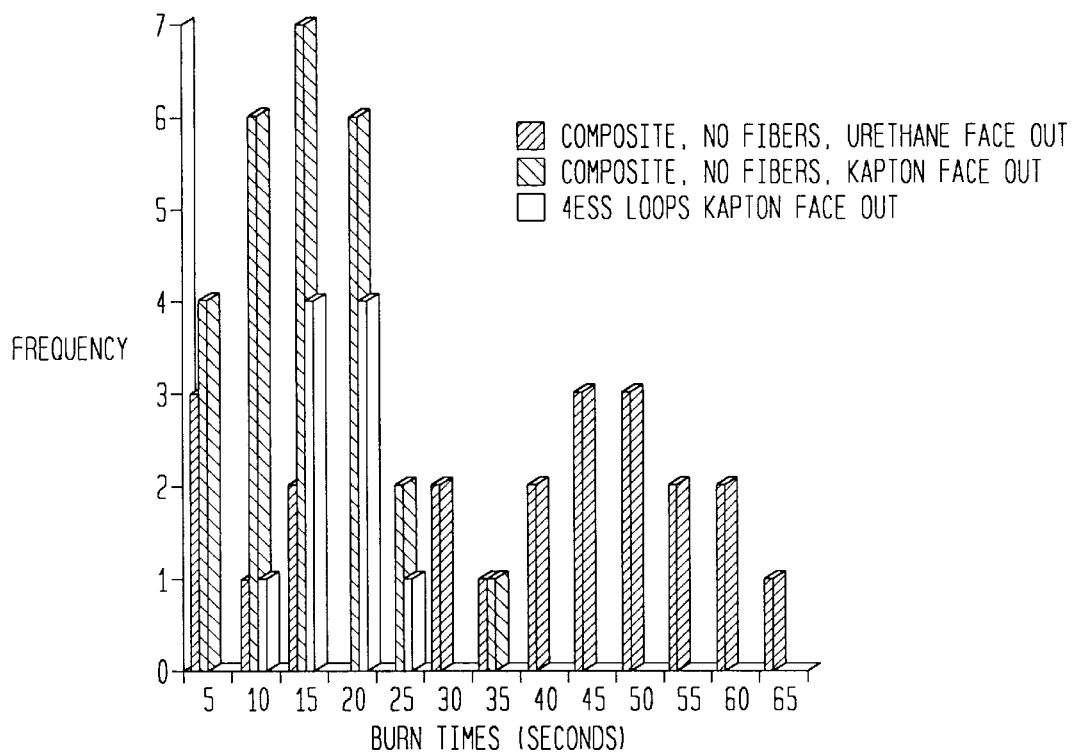
FIGS. 2A and 2B are bar graphs illustrating relative burn times of fiber optical circuit device components with FIG. 2A reflecting burn times with prior art configurations and FIG. 2B reflecting burn times with the configuration of this invention.
Figure 2B:
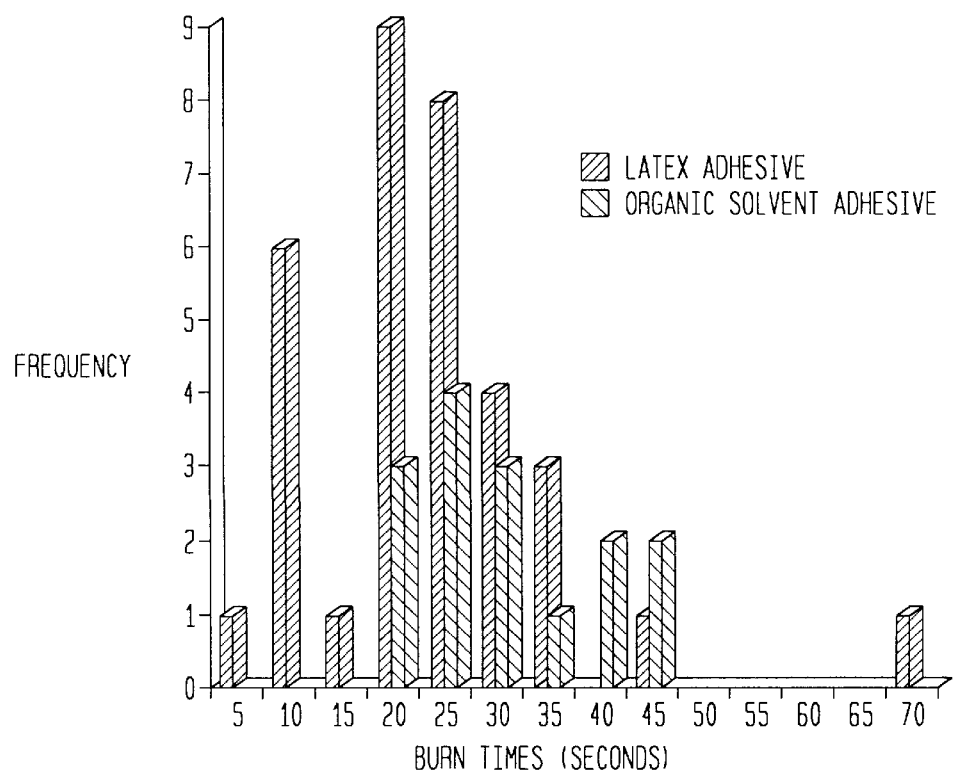

The relative burn times are also illustrated in FIGS. 2A and 2B. FIG. 2A depicts bar graphs of burn times for prior art configurations. The gray-shaded bars of FIG. 2A reflect burn times for KAPTON®-urethane devices as depicted in FIG. 1, i.e., where KAPTON® is used for the substrate 18 and urethane for the encapsulant 14. The average burn time as reflected in FIG. 2A for this configuration was 47.16 seconds. The black shaded bars of FIG. 2A reflect burn times for KAPTON®-urethane devices having a KAPTON® cover sheet facing out, as shown in FIG. 1A, with an average burn time of 17.7 seconds. The white bars of FIG. 2A reflect burn times for KAPTON®-urethane devices having a KAPTON® cover sheet facing out in a cylindrical configuration, as shown inn FIG. 1B, with an average burn time of 16 seconds. As can be seen, alternative configurations such as illustrated in FIGS. 1A and 1B are advantageous in producing lower burn times. However, in comparison, FIG. 2B depicts bar graphs of burn times for inventive configurations, with the gray-shaded bars reflecting burn times for embodiments involving solution polymer adhesives and the black-shaded bars reflecting burn times for embodiments involving emulsion polymers. The average burn times for the solution and emulsion polymers as depicted in FIG. 2B were 28.6 and 21.4 seconds, respectively. Thus, the burn time is significantly reduced with the inventive device without having to rely upon alternative configurations such as illustrated in FIGS. 1A and 1B.

The inventive devices were also tested for adhesive and tack properties and found to meet desired levels for optical circuit devices. In such devices, it is desirable that the adhesive have a peel strength of at least two pounds per inch and sufficient tack so a curved fiber with a radius of one inch will be held in place without allowing the fiber to relax and straighten out, and will be held in place to plus or minus 1 mil. after being pressed into the adhesive at about a onequarter pound force. The adhesives further should be stable when exposed to standard environmental testing as is known in the industry, should not contain reactive constituents that might degrade the composite, and should not require the use of special procedures, such as gloves or ventilation, to handle the adhesive at temperatures up to 100 degrees Centigrade.

The tack of the adhesive refers to its ability to form an instantaneous bond by flowing and wetting-out of the substrate with virtually no applied pressure. Tack can be measured by a variety of methods which are known in the field including loop tack, rolling ball tack, or the like. A number of test methods known in the field are identified as the Pressure Sensitive Tape Council (PSTC) Test Methods, which include a PSTC-5 quick stick tack test. The adhesive properties refer to the ultimate bond realized over a time frame under a specified lamination pressure. A PSTC-1 test comprises a 180 degree peel adhesion test using stainless steel panels and a four and one-half pound rubber roller for contact pressure. Adhesion tests are frequently carried out after 0, 15 minute, 24 hour, 72 hour, and 168 hour dwell times at specified conditions of temperature and humidity. An increase in adhesion with time is indicative of the relative "wet out" of the adhesive. The cohesion reflects the internal strength of the pressure-sensitive adhesive and is measured by shear strength tests, such as PSTC-7 (a dead load shear test) and other tests known in the field including lap shears, shear adhesion failure temperature (SAFT), and Williams plasticity (compression resistance).

Adhesive films comprising the compositions as previously described were tested for adhesive, tack, and cohesive properties, applying standard tests as are known in the field. Summary results obtained from a plurality of samples are reported in Table II below:

$Sb_2O_3$ added at 12 parts $Sb_2O_3$ per 100 parts polymer; column 3 (solution polymer #1), involved a solution polymer comprising about 5 percent vinyl phosphonic acid, 35 percent 2-ethylhexyl acrylate, 35 percent n-butyl acrylate, 23 percent dibromostyrene, and 2 percent acrylic acid; and column 4 (solution polymer #2), involved the solution polymer of column 3 with dispersions of $Sb_2O_3$ added at 10 parts $Sb_2O_3$ per 100 parts polymer.

Figure 3A:
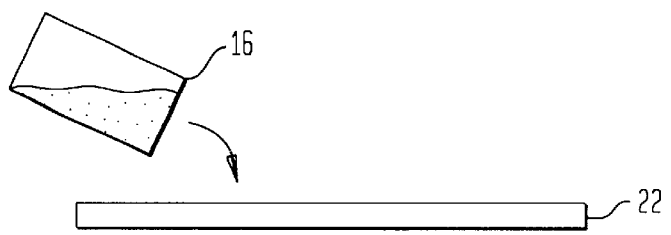
FIGS. 3A–3F illustrate a method of applying a thin film of the inventive adhesive to a circuit substrate.
Figure 3B:
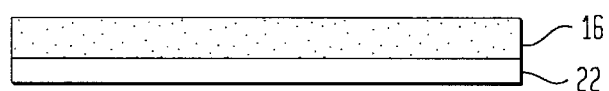
Figure 3C:
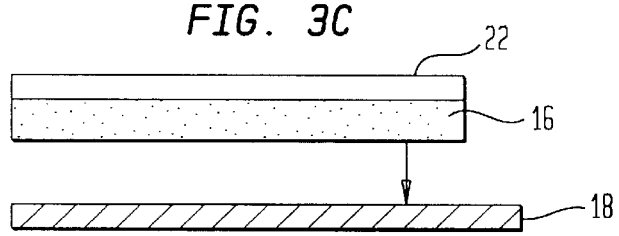
Figure 3D:
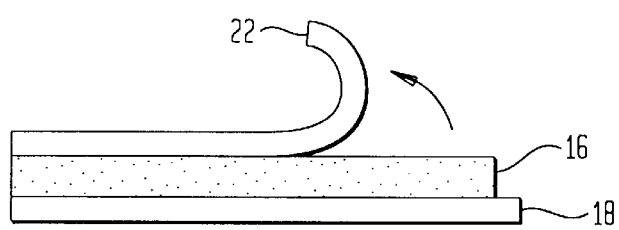
Figure 3E:
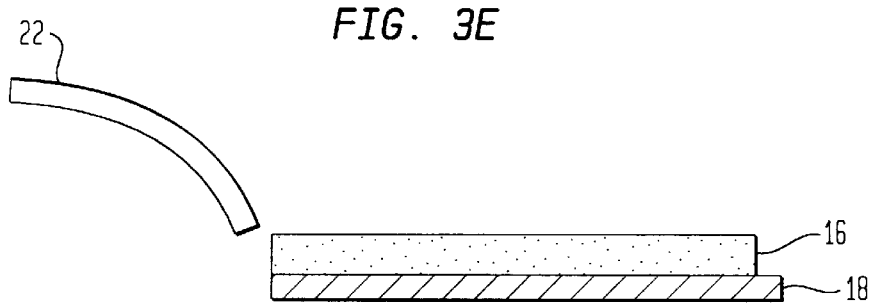
Figure 3F:
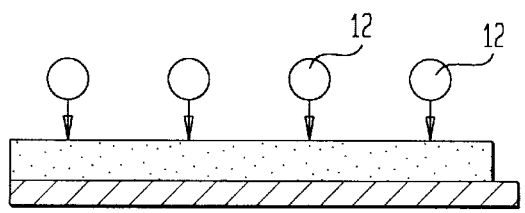

FIG. 1 reflects a flexible optical circuit device in which the present invention adhesive may be used for the layer of adhesive 16. A ready-to-use pressure sensitive adhesive film on an anti-stick substrate may be formed to fabricate the optical circuit device. FIGS. 3A–3F illustrate a method of casting the adhesive 16 and transferring it to the substrate 18 for use in the optical fiber device. Preferably, as shown in FIG. 3A, the adhesive is first cast onto an anti-stick release liner 22 which may comprise, for example, silicone release liner. The adhesive is then air-dried and cured at temperatures of about 120–250 degree Fahrenheit to obtain a ready-to-use film and liner as depicted in FIG. 3B. Preferably, the adhesive layer has a thickness of about 1 mil dry, but can be coated from about 0.5 to up to 5.0 mils dry. Air-drying preferably is continued for about 10–20 minutes and more preferably 15 minutes and curing is performed for about 5 to 10 minutes and more preferably about 6 minutes. In fabricating the apparatus of FIG. 1, the liner with the coating of adhesive may be pressed at ambient temperature onto the substrate 18, preferably comprised of KAPTON™, as shown in FIG. 3C. The release liner 22 is then peeled off, as shown in FIG. 3D, leaving the adhesive film adhered to the substrate, as shown in FIG. 3E. The optical fibers and encapsulating material may then be applied, as illustrated in FIG. 3F. Alternatively, the adhesive may be cast directly onto the substrate 18, without use of the release liner. In that case, a spray coating may be applied. A coating of about one

| | EMULSION POLYMER #1 (w/o $Sb_2O_3$) | EMULSION POLYMER #2 (with $Sb_2O_3$ at 100/12 ratio) | SOLUTION POLYMER #1 (w/o $Sb_2O_3$) | SOLUTION POLYMER #2 (with $Sb_2O_3$ at 100/10 ratio) |
|---|---|---|---|---|
| Adhesive Properties: | | | | |
| PSTC-1, 180° Peel Adhesion, lbs./in | | | | |
| Immediate Dwell (Avg.) | | 2.0 C | 2.6 C | 2.5 C |
| 15' Dwell (avg.) | 3.5 C/4.0 PT | 2.0 C | 3.2 C | 2.9 C |
| 24 hr. Dwell (Avg.) | 7.1 S/6.2PT | 2.6 C | 3.6 C | 3.7 C |
| Tack Properties: | | | | |
| PSTC-5, Quick Stick (Avg.) | | 0.9 C | 0.7 C | 1.6 C/0.7 Z |
| Loop Tack, lbs. (Avg.) | 0.8 | | | |
| PSTC-7, Shear Adhesion, hrs. | | | | |
| 1" × ½" × 1000 g (Avg.) | 0.05 | | | |
| ½" × ½" × 500 g (Avg.) | | 0.11 S | 0.97 S | 0.46 S |
| ½" × ½" × 1000 g (Avg.) | | | 0.25 S | 0.1 S |

PRESSURE SENSITIVE ADHESIVE PROPERTIES OF MIL DRY ADHESIVE FILMS TRANSFER COATED TO 2 MIL TYPE A MYLAR
CURE: 15 MIN. AIR DRY 6 MIN. @ 200° F.

Adhesive Failure Code
C = Clean, Adhesive Failure
PT = Partial Transfer
S = Split
Z = Zipper Column 1 (emulsion polymer #1), involved a latex polymer comprising 1 percent vinyl phosphonic acid, 50 percent 2-ethylhexyl acrylate, 26 percent n-butyl acrylate, and 23 percent dibromostyrene; column 2 (emulsion polymer #2) involved the latex polymer of column 1 with dispersions of millimeter in thickness is advantageous although coatings of from about 0.5 to 5.0 mils in thickness may be used.

It is understood that the embodiments described herein are merely exemplary and that a person skilled in the art may make variations and modifications without departing from the spirit and scope of the invention. All such variations and modifications are intended to be included within the scope of the appended claims.

We claim:

1. An energy-carrying device comprising:
   a substrate;
   at least one energy-carrying filament;
   a layer of pressure-sensitive adhesive disposed between the substrate and the filament for adhering the filament to the substrate, wherein the adhesive comprises a polymer fabricated with the polymerization of (a) one or more acrylic esters, (b) dibromostyrene, and (c) vinyl phosphonic acid.

2. The energy-carrying device of claim 1, further comprising a plurality of filaments secured to the substrate with the layer of pressure-sensitive adhesive.

3. The device of claim 2, wherein the filaments comprise optical fibers.

4. The energy-carrying device of claim 1, further comprising an encapsulant disposed over the at least one filament for protecting the at least one filament and providing structural integrity.

5. The device of claim 4, wherein the encapsulant is fabricated with a thermoplastic material.

6. The device of claim 1, wherein the one or more acrylic esters are selected from the group consisting of butyl acrylate, 2-ethylhexyl acrylate, methyl acrylate, methyl methacrylate, ethyl acrylate, n-butyl acrylate, n-butyl methacrylate, hexyl acrylate, isooctyl acrylate, and vinyl acetate.

7. The device of claim 6, in which the polymer comprises a solution polymer having about one to five percent acrylic acid by weight.

8. The device of claim 7, wherein the polymer comprises a solution polymer of 2-ethylhexyl acrylate and n-butyl acrylate, wherein the ratio of 2-ethylhexyl acrylate to n-butyl acrylate is approximately 1:1.

9. The device of claim 8, wherein the polymer comprises a solution polymer of about 5 percent by weight vinyl phosphonic acid, 35 percent by weight 2-ethylhexyl acrylate, 35 percent by weight n-butyl acrylate, 23 percent by weight dibromostyrene, and 2 percent by weight acrylic acid.

10. The device of claim 9, further comprising antimony trioxide ($Sb_2O_3$) blended with the polymer in an approximate ratio of 100 parts polymer per 6 to 15 parts $Sb_2O_3$.

11. The device of claim 1, further comprising antimony trioxide ($Sb_2O_3$) blended with the polymer in an approximate ratio of 100 parts polymer per about 6 to 15 parts $Sb_2O_3$.

12. The device of claim 1, wherein the acrylic esters comprise 2-ethyl hexyl acrylate and butyl acrylate.

13. The device of claim 12, wherein the polymer comprises an emulsion polymer of 2-ethylhexyl acrylate and butyl acrylate, wherein the ratio of 2-ethylhexyl acrylate to butyl acrylate is about 2:1.

14. The device of claim 13, in which the polymer comprises about 1 percent by weight vinyl phosphonic acid, 50 percent by weight 2-ethylhexyl acrylate, 26 percent by weight n-butyl acrylate, and 23 percent by weight dibromostyrene.

15. The device of claim 14, further comprising antimony trioxide ($Sb_2O_3$) blended with the polymer in an approximate ratio of 100 parts polymer per 6 to 15 parts $Sb_2O_3$.

16. The device of claim 1, wherein the polymer comprises about 11.6 to 15.6% bromine and about 0.25 to 2.5% phosphorus by weight.

17. The device of claim 1, in which the layer of adhesive has a thickness of about 0.5 mil to 5 mil.

18. An improved method for adhering an energy-carrying filament to a substrate of an energy-carrying device, the improvement comprising:
   disposing a layer of pressure-sensitive adhesive between the substrate and the filament for adhering the filament to the substrate, wherein the adhesive comprises the polymer according to claim 1.

19. The improved method of claim 18, wherein the filament comprises an optical fiber, the energy-carrying device comprises an optical circuit device, and the adhesive comprises a polymer fabricated with the polymerization of one or more acrylic esters selected from the group consisting of butyl acrylate, 2-ethylhexyl acrylate, methyl acrylate, methyl methacrylate, ethyl acrylate, n-butyl acrylate, n-butyl methacrylate, hexyl acrylate, isooctyl acrylate, and vinyl acetate; a monomer of dibromostyrene; and a monomer of vinyl phosphonic acid.

* * * * *